June 17, 1947.  C. G. VOKES  2,422,647

FILTER

Filed July 9, 1940

Inventor
Cecil G. Vokes
by
Attorney

Patented June 17, 1947

2,422,647

UNITED STATES PATENT OFFICE 2,422,647

FILTER

Cecil Gordon Vokes, London, England, assignor to Vokes Limited, Guilford, Surrey, England Application July 9, 1940, Serial No. 344,583
In Great Britain July 19, 1939

Section 3, Public Law 690, Aug. 8, 1946.
Patent expires July 19, 1959

5 Claims. (Cl. 210—184)

This invention relates to filters.

While the invention is not limited to any specific application, it will be convenient to consider the filtration of oil in internal combustion engines to illustrate some of the ideas which have resulted in the present conception.

Generally speaking one of two types of filtration is used in the lubricating oil system of such engines, namely the by-pass type in which a relatively small proportion of oil from the circulating pump is passed through a fine filter and very thoroughly cleaned and the series system in which the whole of the circulating oil is filtered. The former necessitates a relatively high pressure and the by-pass is consequently carried from the delivery side of the oil pump to the sump or oil reservoir: a metal gauze diaphragm or the like of small area may be inserted in the parallel lubricating circuit, but particles up to the size which will pass this gauze may be pumped to the bearings and other parts to be lubricated quite a number of times before they get diverted into the by-pass. In the series system the cleaning cannot be so thorough, as only relatively small pressure drop can be allowed, but a filter of large surface area and high efficiency as regards particles other than the very fine ones is arranged in the main circuit and prevents such particles from being carried from the sump or reservoir to the bearings.

The main object of the present invention is to provide an improved filter into which the whole of the oil is passed and within which a proportion is by-passed through a very fine filtering screen and delivered to the engine sump or other reservoir while the greater part is cleared of all but the very fine particles by a screen of large area but low back pressure and delivered to the main lubricating circuit. The resistance and area of the material of the screens and the respective paths can thus be selected to divert a desired proportion of the oil through the by-pass screen: and it will be observed that the fine filter screen is normally relieved of dealing with the great majority of the particles other than the very fine ones and can consequently be of less capacity for equal service. Even if the series screen becomes clogged and is automatically by-passed out of the main circuit, filtration is proceeding on the by-pass system unless that screen is also clogged, but even so that main circuit will continue to be supplied with unfiltered oil.

Figure 1:
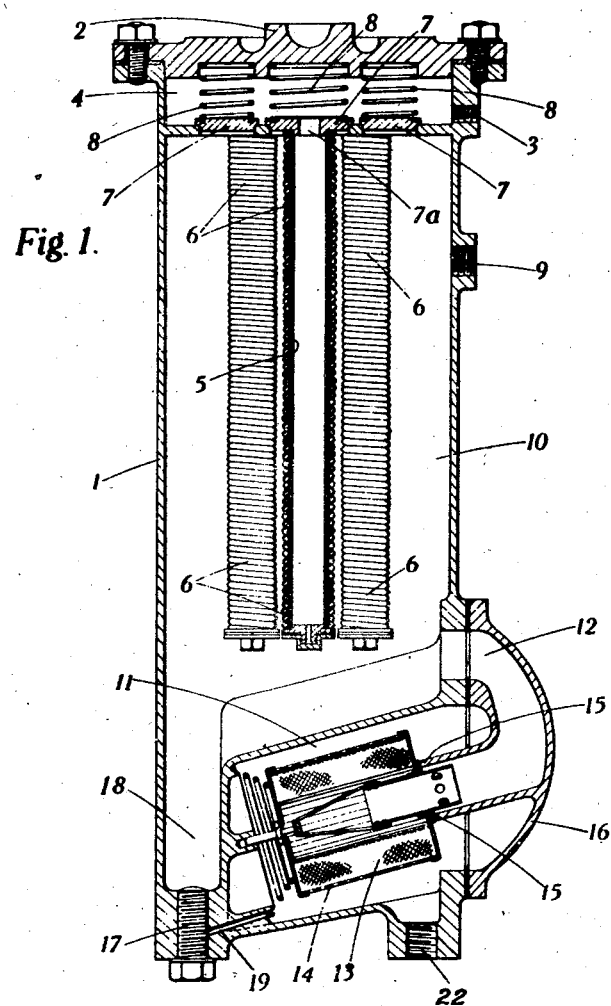
Figure 2:
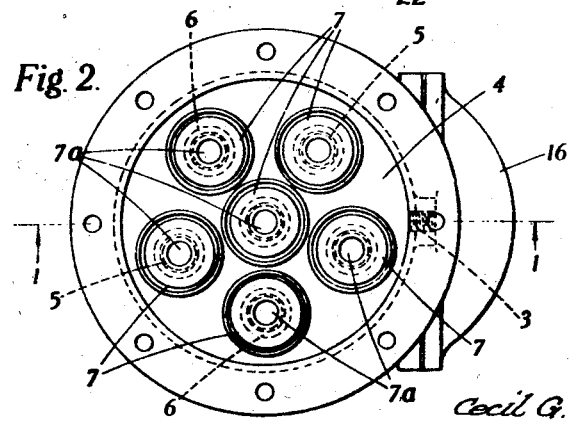

Other parts of the invention reside in the new or improved features, combinations and arrangements embodied in a typical form which will now be described with reference to the accompanying drawing, in which Fig. 1 is a vertical sectional view on line 1, 1 of Fig. 2 and Fig. 2 a plan view with the top cover removed.

In this form a main casing 1 has a cover 2 at the top with the by-pass oil outlet 3 to the engine sump or reservoir in an outlet chamber 4 immediately below the cover. The fine filter elements are of tubular form suspended from the bottom of the outlet chamber and may comprise perforated tubes 5 wound with asbestos cord 6 or any other suitable fine cleansing screen. As shown there are six fine filter elements, each held on to the bottom of the chamber 4 by a flanged top cap 7 perforated at 7a for the passage of the thoroughly filtered oil to the chamber 4 and held in position by a spring 8. The oil inlet 9 enters the part of the chamber 10 in which the fine filter elements are suspended. A third chamber 11 at the bottom of the casing contains the main circuit series filter which may be of the pleated or corrugated screen type, arranged for automatic bypassing of the oil direct to the outlet 22 to the main circuit in case the back pressure becomes excessive owing to the screen becoming clogged. The oil forming the main circuit enters the chamber 11 by passage 12. The main circuit filter as illustrated is of type known per se, comprising a star shaped screen 13 enclosed in a cylindrical perforated case 14. It may be arranged at an incline and spring-pressed against a seating 15 so as to lift from it at a predetermined pressure. The seating 15 and the passage 12 leading to it from the inlet chamber 10 where the fine filtering elements are located can be embodied in a cover 16 bolted on the side of the main casing, facilitating assembly and replacement. On the opposite side of the main casing a single drain plug 17 will serve to close draining passages 18 and 19 from the lowest parts of both the filtering chambers.

It will be observed that in this way a single casing of reasonable size has been arranged to provide the efficiency and safeguards contemplated when connected at three places to the oil inlet, the sump or reservoir and the main lubricating circuit of the engine respectively. It will further be observed that the fine and less fine filtering means are arranged in parallel to receive the fluid at the same or substantially the same pressure, but that the less fine filtering means is connected in series with the bearings or other parts to be lubricated whereas the fluid passing the fine filtering means returns directly to the sump or reservoir. This serves as an example of the idea of maintaining a much greater drop of pressure across the fine filtering means.

I claim:

1. A filter, including a casing formed to provide a first chamber and a second chamber, an inlet leading to the first chamber, an outlet from the first chamber, an outlet leading from the second chamber, a fine filtering means in the first chamber, a channel between the first and second chambers, a less fine filtering means in the second chamber normally filtering all fluid reaching the second chamber through the channel between the first and second chambers, and a valve in said channel normally closed while the less fine filtering means is functioning as a filter, said valve opening under fluid pressure incident to choking of the less-fine filtering means to bypass the fluid around the less-fine filtering means and establish direct connection between said channel and the second chamber.

2. A filter, including a casing formed to provide a first chamber and a second chamber, an inlet leading to the first chamber, an outlet for said first chamber, an outlet leading from the second chamber, a fine filtering means in the first chamber, a channel between the first and second chambers, a less fine filtering means in the second chamber normally filtering all fluid reaching the second chamber through the channel between the first and second chambers, and a bypass control to direct fluid from said channel to said second chamber free of any filtering influence from the less-fine filtering means, said bypass control being closed while the less-fine filtering means is functioning as a filter and opened for bypass function when the less-fine filtering means fails to function as a filter.

3. A construction as defined in claim 1, wherein the valve includes an element fixed with respect to the channel, and a movable cooperating element carried by the less-fine filtering means, said less-fine filtering means being movable under fluid pressure incident to choking of said less-fine filtering means to operate the movable valve member to cause the valve to function as a bypass to establish direct communication between said channel and said second chamber.

4. A construction as defined in claim 1, wherein the valve includes a fixed member encircling but not interrupting the channel and a cooperating movable member fixed with relation to the less-fine filtering means, said less-fine filtering means being movable under fluid pressure when said less-fine filtering means is so choked as to preclude effective filtering function to separate the movable valve member from the fixed valve member to establish direct communication between the channel and second chamber.

5. A construction as defined in claim 1, wherein the casing is formed with an additional chamber having an outlet and open to the fluid passing through the fine filtering means.

CECIL GORDON VOKES.

REFERENCES CITED

The following references are of record in the file of this patent:

UNITED STATES PATENTS

| Number | Name | Date |
|---|---|---|
| 1,906,417 | Renfrew et al. | May 2, 1933 |
| 1,805,450 | Harvey | May 12, 1931 |
| 2,108,798 | Dalrymple | Feb. 22, 1938 |
| 1,506,967 | Bosworth | Sept. 2, 1924 |
| 2,076,935 | Burckhalter | Apr. 13, 1937 |
| 2,098,725 | Hurn | Nov. 9, 1937 |
| 2,271,054 | Williams | Jan. 27, 1942 |
| 2,230,174 | Beale | Jan. 28, 1941 |